(12) United States Patent
Woehrle et al.

(10) Patent No.: US 8,904,895 B2
(45) Date of Patent: Dec. 9, 2014

(54) DRIVE FOR AN ADJUSTMENT DEVICE WITH A WORM WHEEL HAVING A GLOBOID TOOTHING WITH A CYLINDRICAL SECTION

(75) Inventors: Michael Woehrle, Niedereschbach (DE); Andreas Voeckt, Geisingen (DE)

(73) Assignee: IMS Gear GmbH, Donaueschingen (DE)

( * ) Notice: Subject to any disclaimer, the term of this patent is extended or adjusted under 35 U.S.C. 154(b) by 784 days.

(21) Appl. No.: 11/081,015

(22) Filed: Mar. 15, 2005

(65) Prior Publication Data
US 2005/0269478 A1     Dec. 8, 2005

(30) Foreign Application Priority Data
Mar. 16, 2004   (DE) .......................... 10 2004 013 009

(51) Int. Cl.
*F16H 1/16*    (2006.01)

(52) U.S. Cl.
CPC ........................................ *F16H 1/16* (2013.01)
USPC .................................. 74/425; 74/457; 74/458

(58) Field of Classification Search
USPC ........ 74/457, 458, 462, 468, 425, 422, 89.14, 74/89.17, 89.23; 248/429
See application file for complete search history.

(56) References Cited

U.S. PATENT DOCUMENTS

| 2,201,670 | A | * | 5/1940 | Kraus ............................. 74/422 |
| 2,619,845 | A | * | 12/1952 | Mackmann et al. ............ 74/458 |
| 2,802,372 | A | * | 8/1957 | Hatch .............................. 74/458 |
| 4,802,374 | A | * | 2/1989 | Hamelin et al. ............. 74/89.14 |
| 5,083,474 | A | * | 1/1992 | Rouverol ........................ 74/461 |
| 5,094,420 | A |   | 3/1992 | Aihara et al. ........................ 1/8 |
| 5,267,717 | A |   | 12/1993 | Isomura ................................ 1/8 |
| 5,349,878 | A |   | 9/1994 | White et al. ....................... 25/20 |
| 5,421,810 | A | * | 6/1995 | Davis et al. ..................... 602/16 |
| 5,596,904 | A | * | 1/1997 | Wada et al. ..................... 74/422 |
| 6,260,922 | B1 |  | 7/2001 | Frohnhaus et al. ................... 2/2 |
| 2004/0206195 | A1 | * | 10/2004 | Landskron et al. .......... 74/89.14 |

FOREIGN PATENT DOCUMENTS

| DE | 198 15 283 | 7/2000 | ........................ 25/20 |
| EP | 1 330 013 | 7/2003 | ............................ 7/6 |
| WO | WO 99/51456 | 10/1999 | ............................ 2/2 |

* cited by examiner

*Primary Examiner* — Thomas Diaz
(74) *Attorney, Agent, or Firm* — O'Shea Getz P.C.

(57) ABSTRACT

A worm wheel including first toothing regions transitioning into and on either side of a second toothing region and a complete annular surface on both ends of the worm wheel. The first toothing regions may have a constant outer diameter and the second toothing region may be depressed relative to the first toothing region. The first toothing regions may be globoid toothing regions and the second toothing region may be a cylindrical toothing region.

16 Claims, 6 Drawing Sheets

PRIOR ART

DRIVE FOR AN ADJUSTMENT DEVICE WITH A WORM WHEEL HAVING A GLOBOID TOOTHING WITH A CYLINDRICAL SECTION

PRIORITY INFORMATION

This patent application claims priority from German Application No. 10 2004 013 009.4 filed Mar. 16, 2004, which is hereby incorporated by reference.

BACKGROUND OF THE INVENTION

The invention relates to a drive for an adjustment device inside a vehicle, and in particular to a drive for an adjustment device with a worm wheel having a globoid toothing with a cylindrical section.

A known drive for seat adjustment devices is described in EP 1 068 093 B1 and illustrated in FIG. 1. A seat of a vehicle (not shown) is fastened to a holding plate 1 which is coupled in turn to a top rail 3. A motor 2 is rigidly connected to the holding plate 1, and thus the top rail 3, with fastening lugs 10. A drive shaft 11 is located on both ends of the motor 2. The drive shaft 11 and a gear mechanism 9 define a connection detailed in EP 1 068 093 B1. The gear mechanism 9 sits within a U-shaped retaining bracket 8, where the retaining bracket 8 may be fastened to the top rail 3 through fastening holes 7.

The top rail 3 slides along a fixed bottom rail 4 fastened to a floor of the motor vehicle (not shown) either directly or indirectly through adjustment and/or bearing elements (not shown).

The top rail 3 and the bottom rail 4 are held by contact or support regions so as to create a cavity. A threaded spindle 5 is located within the cavity. The threaded spindle 5 is accommodated between retaining brackets 6 which are fixed to the bottom rail 4 by an appropriate bolt connection or an analogous fastener projecting through fastening holes in the retaining bracket 6 and bottom rail 4. Spindle 5 is screwed on to the retaining brackets 6 with appropriate fastening nuts.

FIG. 2 is a detailed illustration of the gear mechanism 9. The gear mechanism 9 comprises a drive worm 20 which is configured to engage an outer toothing of a worm wheel 30. The drive worm 20 is connected to the motor 2 through the drive shaft 11. The worm wheel 30 has an internal thread 32 which engages the threaded spindle 5. When the motor 2 turns, it transmits its motion through the drive shaft 11 to the drive worm 20. The drive worm transmits its rotational motion to the worm wheel 30. The worm wheel 30 propels the threaded spindle 5 which therefore moves the top rail 3 and the vehicle seat longitudinally.

As is shown in FIG. 2, the gear mechanism 9, which includes the drive worm 20 and the worm wheel 30, is located in a housing which is composed of four housing plates 14. The housing is situated within the U-shaped recess of a retaining bracket 8. Both the drive worm 20 and the worm wheel 30 have annular projections 21 and 31 respectively at their ends. The annular projections 21 and 31 are supported within corresponding openings in the housing plates 14. The individual housing plates 14 have bearing holes or bearing bushings 14a. Thrust washers 16 are seated on the annular projections 31 of worm wheel 30, while thrust washers 18 are seated on the annular projections 21 of the drive worm 20. The thrust washers 16 and 18 are particularly necessary to reduce wear between the bearings 14a and the cylindrical toothings on the ends of worm wheel 30.

In FIG. 3, the worm wheel 30 together with the cylindrical toothing 33 run helically relative to the A axis. The cylindrical helical toothing 33 has helically shaped and continuous tooth crowns 34 and tooth roots 35.

The toothing engagement between the cylindrical helical toothing 33 and the drive worm 20 is sensitive to any axial misalignment of the spindle nut caused by assembly, component tolerances, and/or wear of the individual components.

The toothing roots 35 of the toothing 33 extend to the end faces 37 of the worm wheel 30. This configuration may cause damage to the bearing bushings 14a in the housing plates 14 when the toothing roots 35 on the end faces 37 contact the bearing bushings 14a. To prevent damage to the bearing bushings 14a, thrust washers 16 are positioned over the annular projections 31 and against the end faces 37. The thrust washers typically have tabs 16a to engage in the toothing spaces of the cylindrical helical toothing 33 to prevent circumferential sliding.

However, the thrust washers 16 have various disadvantages. Due to the need for additional parts, they may increase the fabrication and assembly expense for this type of gear mechanism. In another example, thrust washers 16 produce undesirable noises. When these thrust washers 16 are used, for example, rattling noises and frictional noises are produced which are caused by deviations in concentricity and shaft-center-distance tolerances. In a further example, the axial play of the spindle nut within the housing is increased by the summation of individual tolerances.

There is a need for an improved drive with fewer components to reduce fabrication and assembly costs, while concurrently eliminating the noise problems.

SUMMARY OF THE INVENTION

A worm wheel comprising first toothing regions transitioning into and on either side of a second toothing region and a complete annular surface on both ends of the worm wheel. The first toothing regions may have a constant outer diameter and the second toothing region may be depressed relative to the first toothing region. The first toothing regions may be globoid toothing regions and the second toothing region may be a cylindrical toothing region. The second toothing region may be centered relative to a longitudinal axis of the worm wheel. The first toothing regions and the second toothing region may be configured to define toothing grooves obliquely orientated to a longitudinal axis of the worm wheel. The complete annular surfaces may extend to the outer diameter of the first toothing regions. The complete annular surfaces may extend to an intermediate diameter between tooth roots and tooth crowns of the first toothing regions. A circular arc section may extend on both sides from a central straight section defined by a tooth bottom land in tooth spaces. The worm wheel may further comprise annular projections formed as integrated components on both ends of the worm wheel. The worm wheel may be milled from metal.

In another embodiment, a gear mechanism comprises a drive worm; and the worm wheel configured to engage the drive worm. The second toothing region may axially extend a distance that compensates for axial play, twice axial misalignment and twice expected wear between the individual parts. The worm wheel may have an internal thread configured to engage the spindle. The spindle may be fixed and the worm wheel may be located rotatably on the spindle. The complete annular surface may be at least approximately as large as bearing bushings of a housing accommodating the gear mechanism.

In another embodiment, a drive assembly comprises a spindle; a motor; and a gear mechanism configured to move longitudinally about the spindle, where the drive worm is configured to be propelled by the motor. The drive assembly may further comprise a vehicle seat fixedly configured to the drive.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
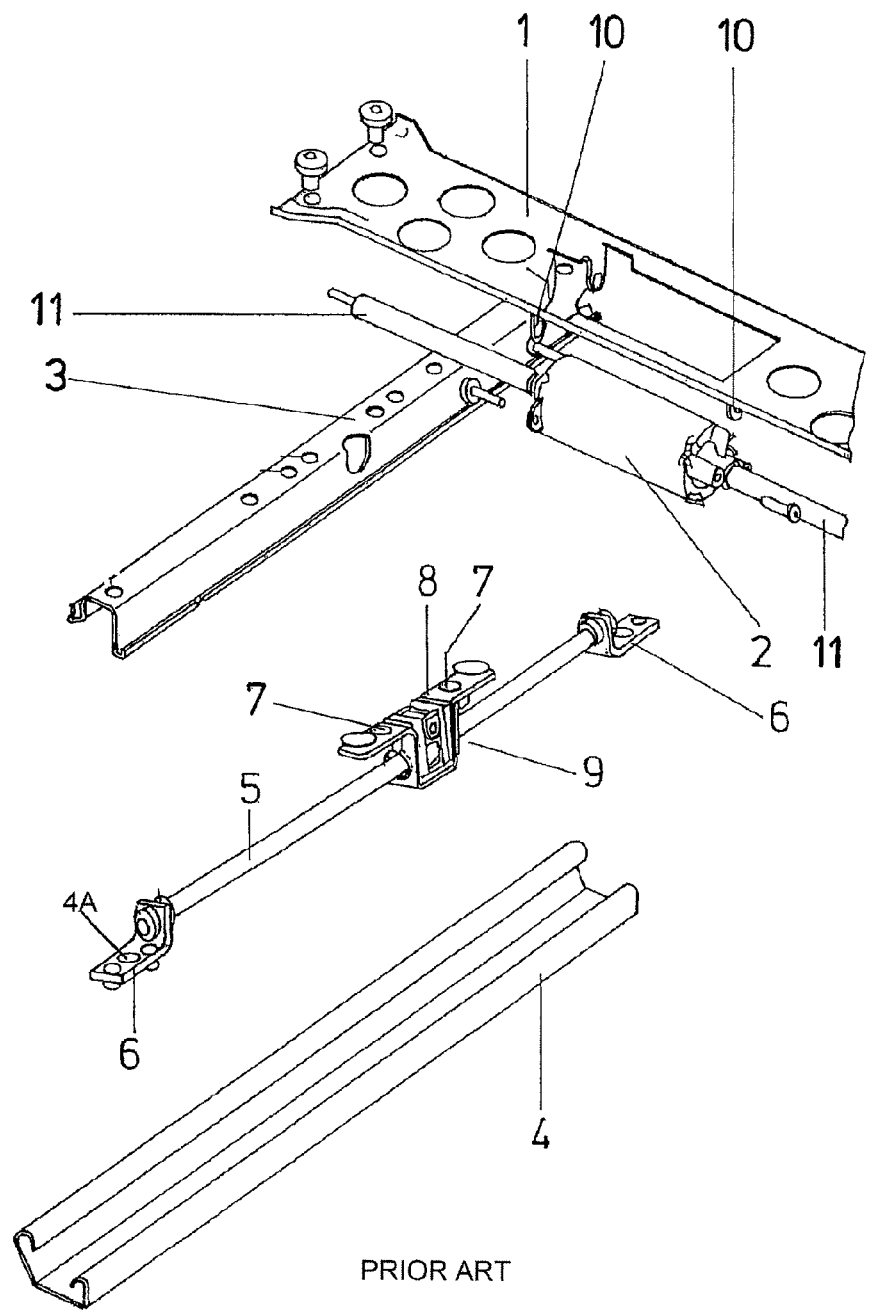
FIG. 1 illustrates a prior art drive assembly comprising a gear mechanism configured to move on a spindle.
Figure 2:
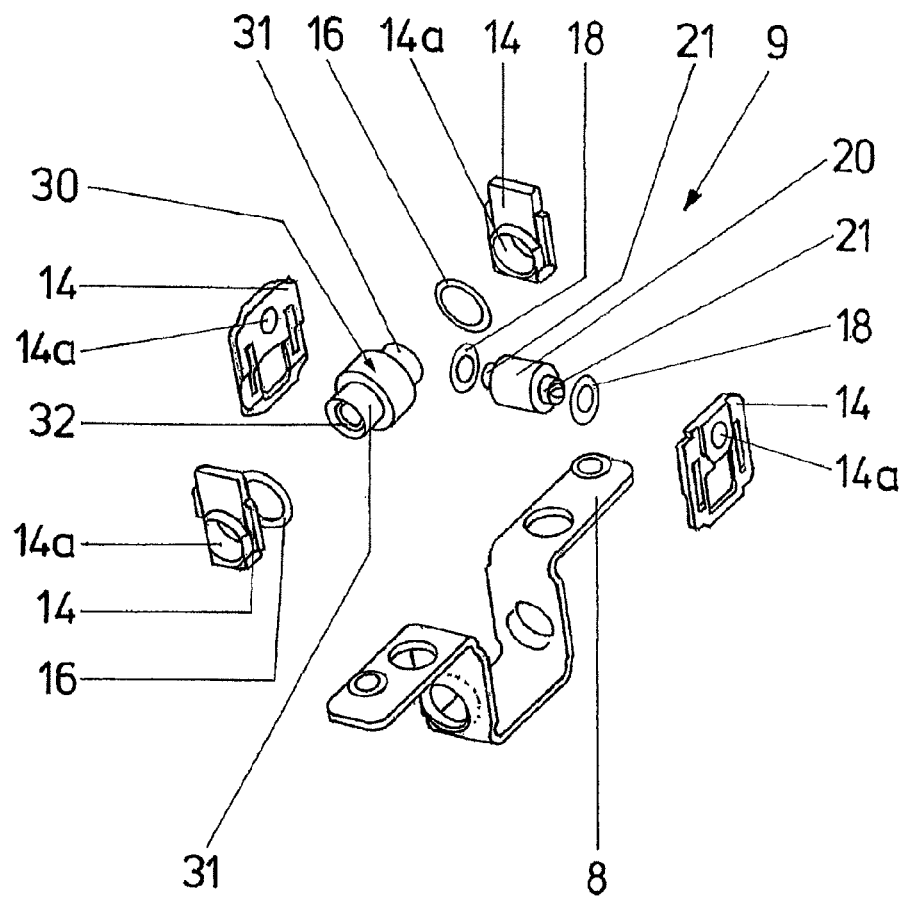
FIG. 2 illustrates an exploded view of the gear mechanism in FIG. 1.
Figure 3:
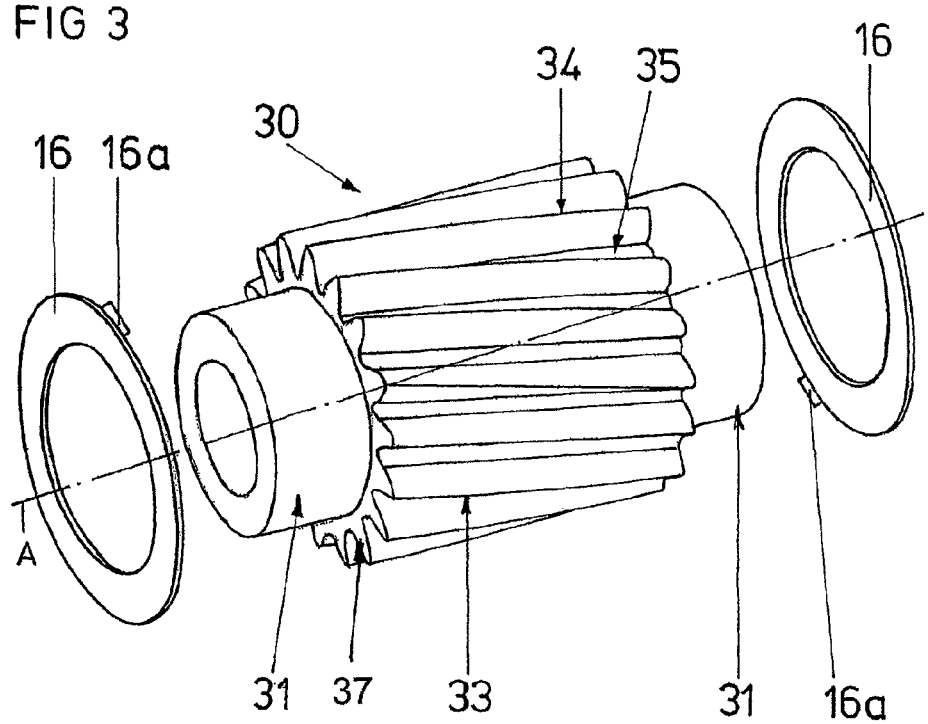
FIG. 3 illustrates an enlarged view of a worm wheel and thrust washers in the gear mechanism in FIG. 2.
Figure 4:
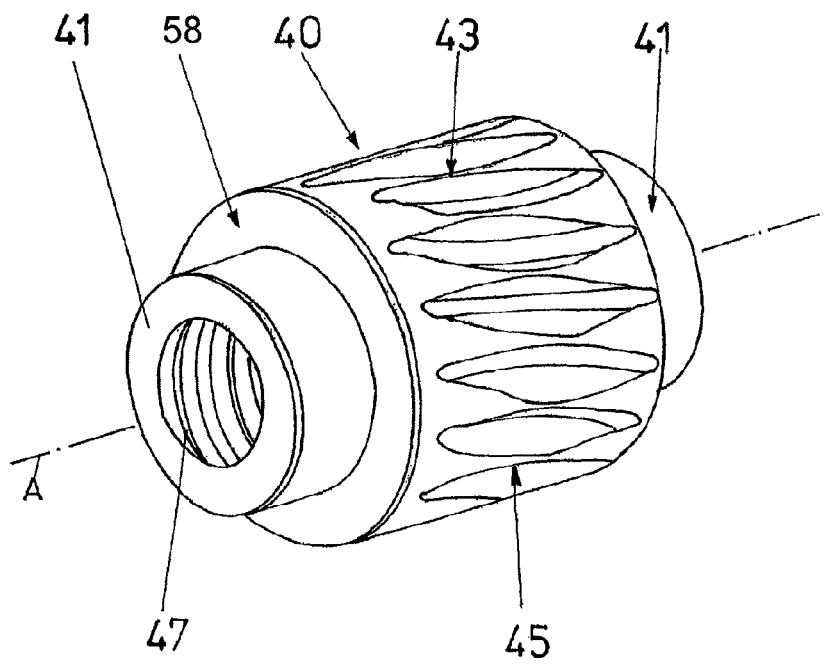
FIG. 4 is a perspective view illustrating an example of a worm wheel according to the invention.
Figure 7:
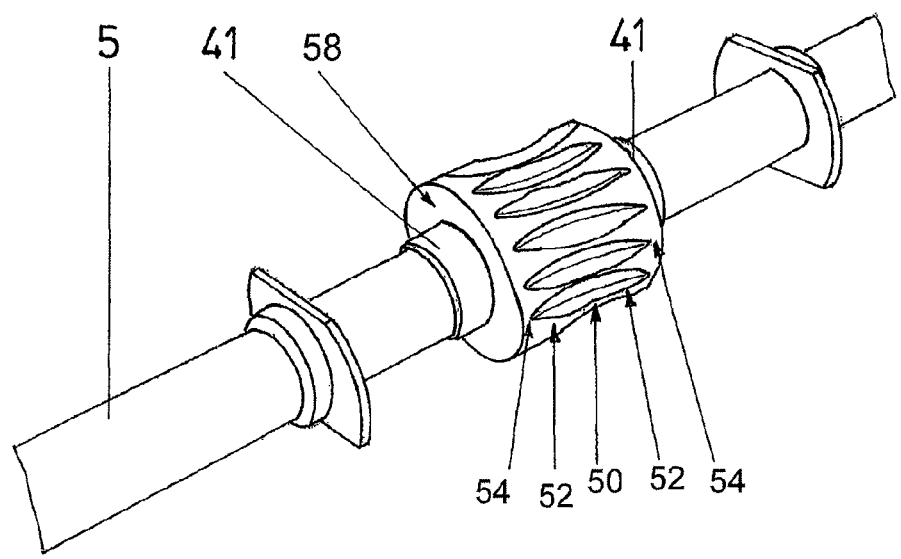
FIG. 7 illustrates a perspective view of the worm wheel in FIGS. 4-6 mounted on a spindle.
Figure 5:
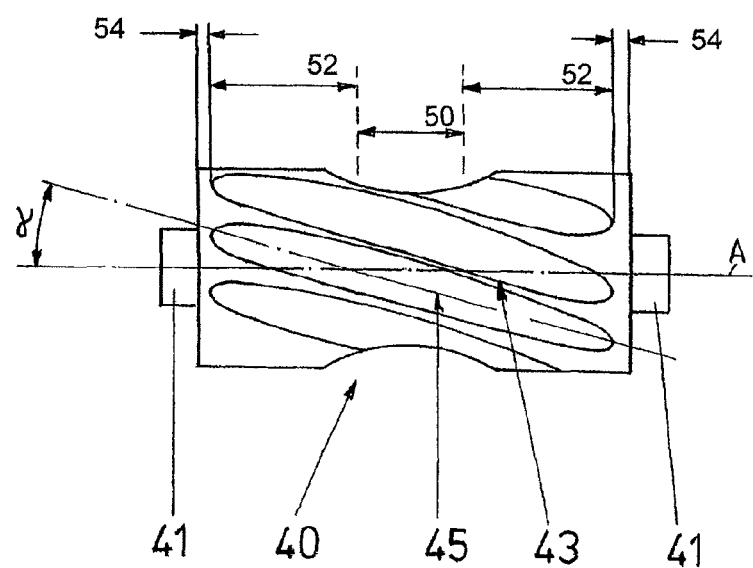
FIG. 5 illustrates a side view of the worm wheel in FIG. 4.
Figure 6:
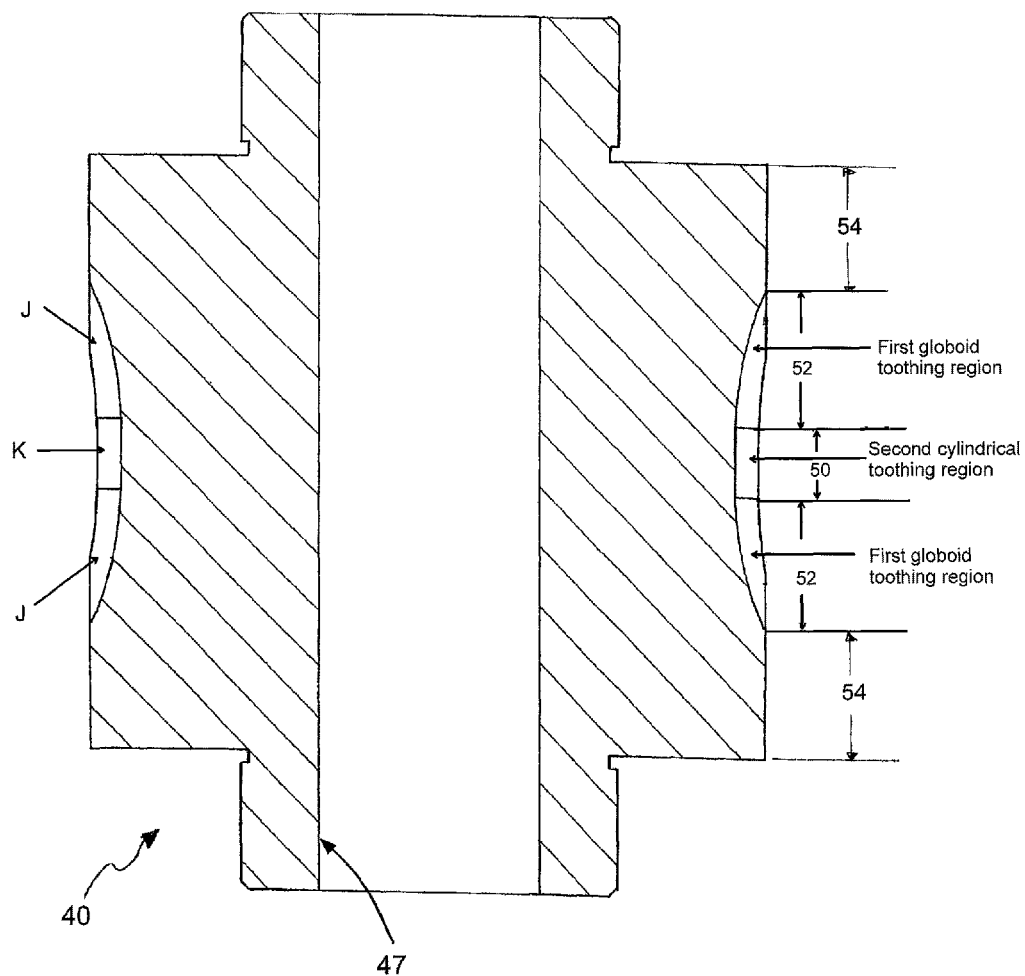
FIG. 6 illustrates a side sectional view of the worm wheel in FIGS. 4 and 5.

FIG. 4 is a perspective view illustrating an example of a worm wheel 40. FIG. 5 illustrates a side view of the worm wheel 40 illustrated in FIG. 4. The worm wheel 40 comprises a circumferential section having a second toothing region, for example cylindrical toothing 50, which transitions on both sides into a first toothing region, for example a globoid toothing 52. At least one complete annular surface 58 remains on opposing axial ends of worm wheel 40. An edge region 54 absent of any toothing is positioned adjacent to the annular surface 58 on the axial ends of the worm wheel 40. In the present example, annular projections or flanges 41 project from the opposing annular surfaces 58. The annular surface 58 extend up from the flanges 41 to the outer diameter of worm wheel 40.

The cylindrical toothing 50 is centered relative to the longitudinal axis of worm wheel 40. The toothing grooves of the cylindrical toothing 50 and the globoid toothing 52 are configured obliquely relative to the A axis of the worm wheel 40. The oblique toothing grooves are offset at an angle of α relative to A axis.

In another example, the cylindrical toothing 50 axially extends a distance to compensate for an axial play, two times an axial misalignment and two times an expected wear between the individual parts of the drive.

The cylindrical toothing 50 and the globoid toothing 52 define a tooth crown 43, a tooth bottom land and tooth spaces 45. The tooth crown 43 in the cylindrical toothing region of the worm wheel is depressed as compared to the tooth crown 43 in the globoid toothing region of the worm wheel. Circular arc sections extend on both sides from a central straight section defined by the tooth bottom land in the tooth spaces 45 to the adjacent tooth crowns 43. The worm wheel 40 has an internal thread 47 configured to engage a threaded spindle 5 of the drive.

In one example, the worm wheel 40 is a milled metal part.

Figure 8:
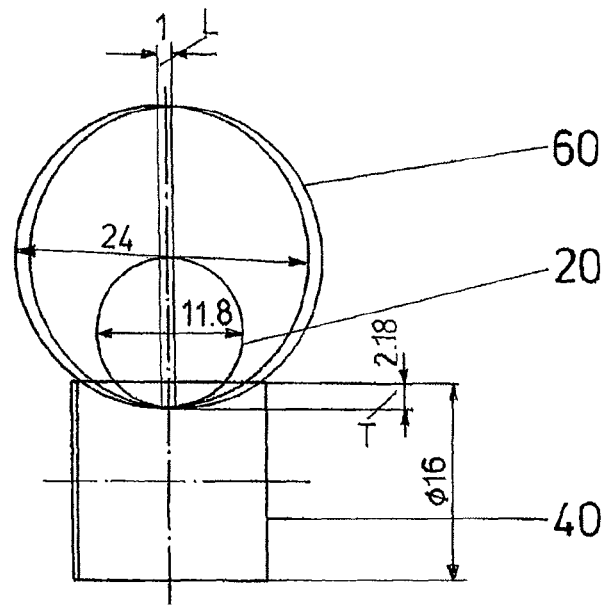
FIG. 8 is a graphical illustration of the fabrication process of the worm wheel in FIGS. 4-7 with a cutter.

FIG. 8 is a graphic illustration of one example of the fabrication process of the worm wheel in FIG. 4. First, a worm wheel blank is provided. The desired tooth contour of worm wheel 40 is created using a rotating hobbing cutter 60. The hobbing cutter is obliquely offset by a predetermined angle, for example between 5° and 20°, relative to the A axis of the worm wheel blank. The hobbing cutter is subsequently rotated and inserted to a predetermined depth perpendicular to the A axis. The tooth spacing 45 of the toothing is obtained by moving the cutter 60 longitudinally along the A axis a predetermined distance L, for example between approximately 0.5 mm and 2.0 mm. The cutter 60 is then removed from the milled tooth space 45. The process is repeated for each tooth space.

The worm wheel 40 has multiple advantages over the prior art. For example, the thrust washer may be eliminated from the drive. In another example, the worm wheel 40 may improve the acoustics of the drive by essentially eliminating fluctuations in torque and vibrations. In another example, the drive utilizing the worm wheel 40 may be simpler to fabricate. In another example, an improved run-out of the end surfaces may be achieved. In another example, bearing surfaces projecting beyond the addendum circle of the toothing may be provided. In still another example, a separate deburring process is eliminated due to the absence of ridging on the functional and therefore frictional surfaces.

Figure 9:
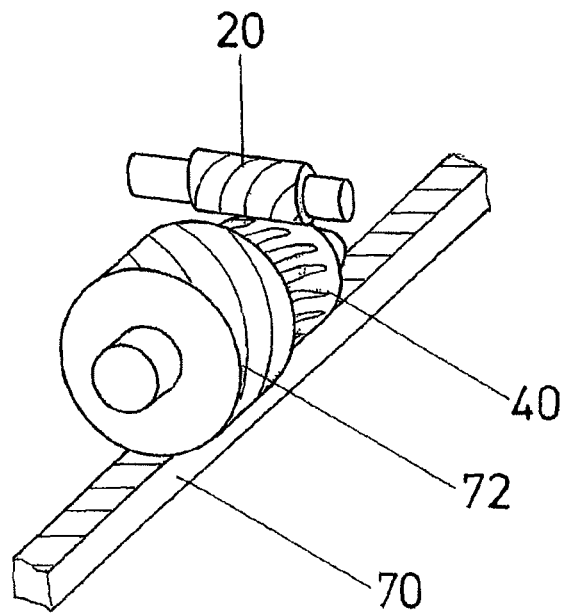
FIG. 9 illustrates another example of a worm wheel with a toothed rack.

FIG. 9 illustrates another example of a drive. A toothed rack 70 meshes with a worm 72 replacing the spindle 5. In another example, a worm wheel 40 is formed as an integrated component on the worm 72, where the worm wheel 40 is driven by a drive worm 20.

The worm wheel 40 illustrated in FIGS. 4-7 may be connected in a rotationally fixed manner and coaxially aligned to the worm 72. In the present example, the worm wheel 40 and worm 72 are located on a common shaft.

What is claimed is:

1. A drive assembly, comprising:
a drive worm; and
a worm wheel configured to engage the drive worm, the worm wheel having first toothing regions axially transitioning into and on either side of a second toothing region and an annular surface on opposing ends of the worm wheel, where each first toothing region has globoid toothing and first tooth crowns, where the second toothing region has cylindrical toothing and second tooth crowns, and where the globoid toothing and the cylindrical toothing define toothing grooves, where the toothing grooves are obliquely orientated by a predetermined angle α to a longitudinal axis of the worm wheel, and where the angle α is between 5° and 20°.

2. The drive assembly of claim 1, where the second tooth crowns are depressed relative to the first tooth crowns.

3. The drive assembly of claim 2, further comprising:
a spindle;
a motor; and
a gear mechanism configured to move longitudinally about the spindle, where the gear mechanism comprises the drive worm and the worm wheel, and where the drive worm is propelled by the motor.

4. The drive assembly in claim 3, where the second toothing region is centered relative to a longitudinal axis of the worm wheel.

5. The drive assembly in claim 3, where the annular surfaces extend to the outer diameter of the first toothing regions.

6. The drive assembly in claim 3, where the annular surfaces extend to an intermediate diameter between tooth roots and the tooth crowns of the first toothing regions.

7. The drive assembly in claim 3, where the annular surfaces are at least approximately as large as bearing bushings of a housing accommodating the gear mechanism.

8. The drive assembly in claim 3, where the second toothing region is configured to axially extend a distance that compensates for an axial play, two times an axial misalignment and two times an expected wear between the worm gear and the drive worm.

9. The drive assembly in claim 3, where a circular arc section extends on both sides from a central straight section defined by a tooth bottom land.

10. The drive assembly in claim 3, where the worm wheel has an internal thread configured to engage the spindle.

11. The drive assembly in claim 3, where the spindle is fixed and the worm wheel is located rotatably on the spindle.

12. The drive assembly of claim 3, where the worm wheel is a milled metal part.

13. The drive assembly in claim 3, further comprising annular projections formed as integrated components on both ends of the worm wheel.

14. The drive assembly in claim 3, further comprising a vehicle seat fixedly configured to the drive.

15. A drive assembly, comprising:
a drive worm; and
a worm wheel configured to engage the drive worm, the worm wheel having first toothing regions axially transitioning into and on either side of a second toothing region and an annular surface on opposing ends of the worm wheel, where each first toothing region has globoid toothing and first tooth crowns, where the second toothing region has cylindrical toothing and second tooth crowns, and where the globoid toothing and the cylindrical toothing define toothing grooves, where the toothing grooves are obliquely orientated by a predetermined angle $\alpha$ to a longitudinal axis of the worm wheel, and where the angle $\alpha$ is between 5° and 20°,
where the worm wheel has an internal thread configured to engage a spindle, and a vehicle seat is fixedly configured to the drive.

16. A drive assembly, comprising:
a drive worm; and
a worm wheel configured to engage the drive worm, the worm wheel having first toothing regions axially transitioning into and on either side of a second toothing region and an annular surface on opposing ends of the worm wheel, where each first toothing region has globoid toothing and first tooth crowns, where the second toothing region has cylindrical toothing and second tooth crowns, and where the globoid toothing and the cylindrical toothing define toothing grooves, where the toothing grooves are obliquely orientated by a predetermined angle $\alpha$ to a longitudinal axis of the worm wheel, and where the angle $\alpha$ is between 5° and 20°,
where the worm wheel has an internal thread configured to engage a spindle, and the second toothing region is substantially centered relative to a longitudinal axis of the worm wheel.

* * * * *